United States Patent [19]
Kapell

[11] 3,836,694
[45] Sept. 17, 1974

[54] RE-ENTERABLE SPLICE ENCLOSURE

[76] Inventor: Henry K. Kapell, P.O. Box 33427, Mahtomedi, Wash. 55133

[22] Filed: July 5, 1973

[21] Appl. No.: 376,285

Related U.S. Application Data
[63] Continuation-in-part of Ser. No. 274,479, July 24, 1972, abandoned.

[52] U.S. Cl.................. 174/22, 174/23 R, 174/76, 174/92, 174/93
[51] Int. Cl............................................ H02g 15/20
[58] Field of Search ............................. 174/91–93, 174/76, 77 R, 23, 23 R, 98, 88 R, 22

[56] References Cited
UNITED STATES PATENTS
288,002    11/1883    Brown............................ 174/98 X

| | | |
|---|---|---|
| 3,607,487 | 9/1971 | Biskeborn et al. ......... 174/23 C UX |
| 3,663,740 | 5/1972 | Dellett................................. 174/92 |

FOREIGN PATENTS OR APPLICATIONS
1,920,637   10/1970   Germany.......................... 174/88 R

*Primary Examiner*—Darrell L. Clay
*Attorney, Agent, or Firm*—Alexander, Sell, Steldt & DeLaHunt

[57]    ABSTRACT

A re-enterable splice enclosure including anchor members in permanent secure engagement adjacent the terminal ends of spliced cables, a separable two part housing releasably attached between the anchor members and forming a cavity about the splice and a layer of a water restricting material about the splice within the cavity.

12 Claims, 6 Drawing Figures

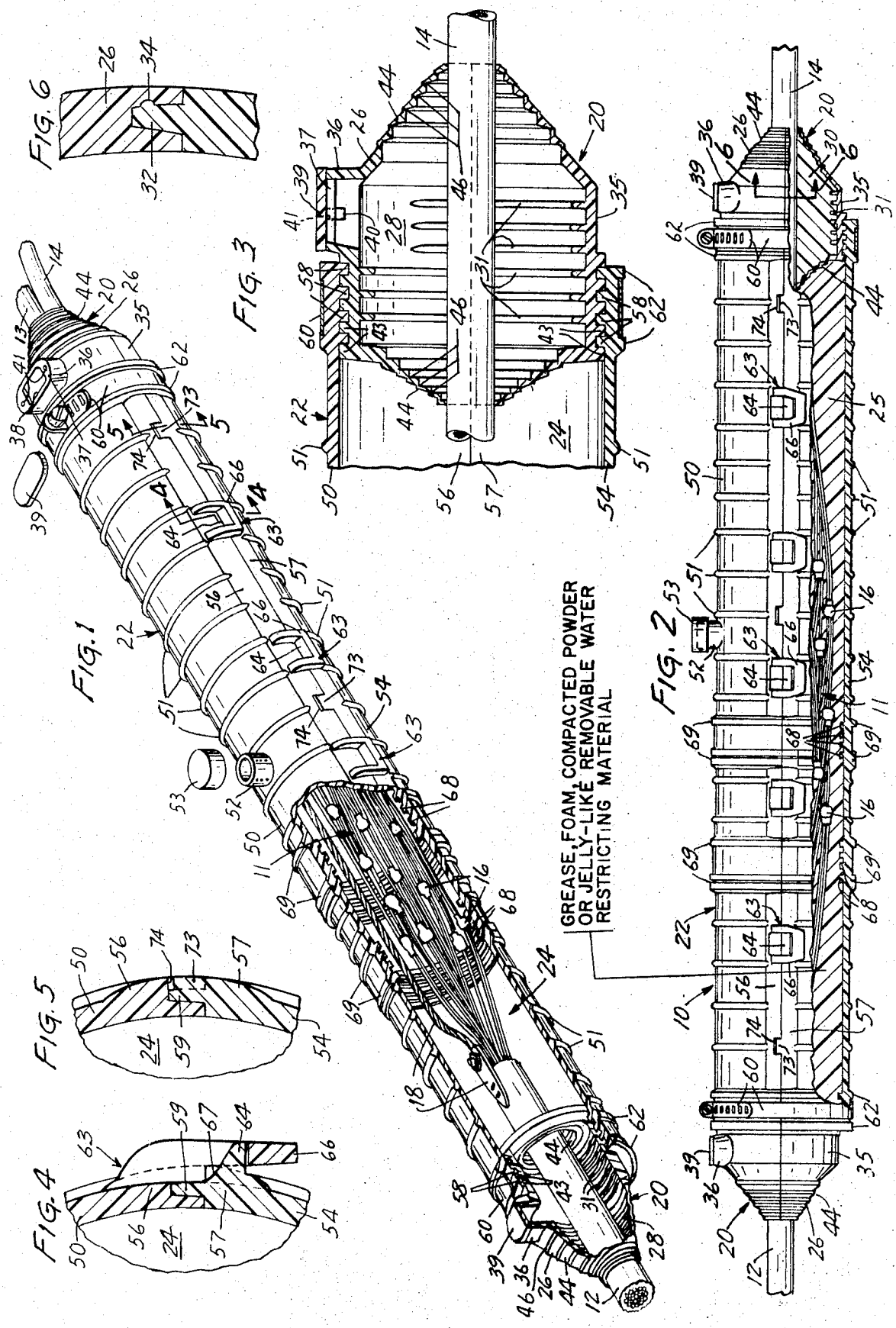

RE-ENTERABLE SPLICE ENCLOSURE

CROSS REFERENCE

This application is a continuation-in-part of our pending application, Re-Enterable Splice Enclosure, Ser. No. 274,479.

FIELD OF THE INVENTION

This invention relates to enclosures for restricting moisture from entering a splice in a communication cable, and in one aspect to an enclosure affording re-entry to the splice which enclosure may be re-assembled subsequent to re-entry.

DESCRIPTION OF THE PRIOR ART

In addition to the type of water restricting splice enclosures disclosed in U.S. Pat. No. 2,908,744 in which the splice is permanently cast in a hard resinous material, and in U.S. Pat. No. 2,930,835 in which a shell cast about the splice which must be destroyed to re-enter the splice, there is a need for such an enclosure which affords re-entry to the splice and subsequent re-assembly of the splice enclosure. Such an enclosure may be desirable where known future changes will be required in the splice connections or where a strong probability of such changes exists.

Heretofore, however, the only known enclosures affording re-entry and subsequent re-assembly have been gas tight enclosures. These enclosure assemblies typically have comprised end members adapted for engagement with the terminal end of the cables to be spliced, (which end members have been either sealing rings of mastic material formed about the cable or anchor members comprising a hardenable liquid material cast within a shell adapted for engagement over the cable), and a separable housing adapted to be assembled over the end members to provide a gas tight chamber about the splice.

This type of re-enterable enclosure, however, while finding some use on non-pressurized cables, is best suited for use over splices between cables which are internally gas pressurized so that a higher than atmospheric gas pressure will be provided within the enclosure to help restrict the entrance of moisture.

Additionally, such enclosures are relatively expensive because of the sealing means, precise fitting parts, and elaborate attaching means they require. Despite their construction such enclosures may still admit moisture where they are improperly assembled, or where external pressures cause distortion of the attached enclosure assembly.

Thus, heretofore there has not been an inexpensive, reliable, enclosure assembly for use over splices between non-gas pressurized communication cables which allows re-entry to the splice and subsequent re-assembly of the enclosure.

SUMMARY OF THE INVENTION

The present invention provides a splice enclosure which affords re-entry and re-assembly, and is suitable for use in enclosing and restricting moisture from splices between non-gas pressurized cables.

The re-enterable splice enclosure according to the present invention is of simple, inexpensive construction, so that its use on small cable splices will be economically justified even where the probability of re-entering a splice is low.

With the present invention, moisture is restricted from contacting a splice within the enclosure by a removable layer of water restricting material around the splice within the enclosure so that the enclosure does not require extensive or elaborate sealing means.

Additionally, the splice enclosure according to the present invention affords novel attaching means which allow it to be easily and securely attached and subsequently afford easy access to the splice within the enclosure.

According to the present invention there is provided a re-enterable splice enclosure enclosing and restricting entrance of moisture into a splice between at least two lengths of jacketed communication cable. The enclosure comprises a pair of anchor members each securely engaging a spliced cable adjacent its terminal end; a separable two part housing having spaced ends in engagement over the anchor members to define an enclosed splice cavity therebetween containing the splice between the cables; attaching means releasably attaching the housing parts to the anchor members, and a water restricting layer of material within the splice cavity around the splice, which layer is grease like or friable to afford its removal and re-entry to the splice.

BRIEF DESCRIPTION OF THE DRAWING

The invention will be more fully understood after reading the following description which refers to the accompanying drawing wherein:

FIG. 1 is a perspective view of a splice enclosure according to the present invention which is partially in section, and which is shown without a hard resinous material used within a sectioned shell to complete an anchor member, and without a material used about a splice within the enclosure to restrict moisture so that certain details of the enclosure structure and splice will be more clearly seen;

FIG. 2 is a vertical view, partially in section, of the splice enclosure shown in FIG. 1, except that the enclosure is shown complete with the aforementioned materials;

FIG. 3 is an enlarged fragmentary longitudinal section of an end of the splice enclosure as shown in FIG. 1;

FIG. 4 is an enlarged fragmentary transverse sectional view taken approximately along the lines 4—4 of FIG. 1;

FIG. 5 is an enlarged fragmentary transverse sectional view taken approximately along the lines 5—5 of FIG. 1; and FIG. 6 is an enlarged fragmentary transverse sectional view taken approximately along the lines 6—6 of FIG. 2.

DESCRIPTION OF THE PREFERRED EMBODIMENT

Referring now to FIG. 2 there is shown a re-enterable splice enclosure according to the present invention generally designated by the number 10. The re-enterable splice enclosure 10 is enclosing a splice 11 between a single jacketed communications cable 12 and a pair of jacketed communications cables 13 and 14, as is more clearly shown in FIG. 1 which illustrates the splice enclosure 10 without certain required fill materials.

The enclosed splice 11 is of a conventional type, and as illustrated has been made with a multiplicity of spring reserve wire connectors 16, of the type disclosed in U.S. Pat. No. 3,012,219, with each connector 16 being used to make an electrical connection between certain predetermined individual insulated conductors from the spliced cables 12, 13 and 14. The splice 11 also includes a grounding clip and wire assembly 18 extending between the conductive shields of the cables 12, 13 and 14.

The re-enterable splice enclosure 10 comprises a pair of anchor members 20 adapted as illustrated for secure engagement over the jackets of the cables 12, 13 and 14 adjacent their terminal ends; a separable two part housing 22 having spaced ends adapted for engagement over the anchor members 20 to define an enclosed splice cavity 24 therebetween to contain the exposed conductors and connectors 16 of the splice 11; attaching means for releasably attaching the two part housing 22 together and to the anchor members 20; and a water restricting layer of material 25 within the splice cavity 24 around the splice 11 (shown in FIG. 2), which layer of material 25 is grease like or friable to afford its removal and re-entry to the splice 11.

The anchor members 20 each comprise a shell 26 which may be made of any suitable hard moldable material such as polypropylene or a polyallomer copolymer such as propylene-ethylene. The shell 26 is adaptable for engagement over the jacket of a cable or cables to be spliced adjacent a terminal end thereof, and shaped to provide an annular cavity 28 around the cable. The cavity 28 provides a mold for a resinous liquid material 30 (illustrated in FIG. 2) which may be poured into the cavity 28 in a liquid state, and which is hardenable within the annular cavity 28 at normal application temperatures. The material 30 is adapted upon hardening to adhere to the jacket of a cable and to conform around ribs 31 projecting from the inner surface of the shell 26 to provide a rigid anchor member 20 in firm engagement with the jacket of a cable or cables to which it is attached.

The shell 26 for each anchor member 20 is comprised of interlocking halves having edges (FIG. 6) shaped to mate in tongue 32 and groove engagement. The tongue 32 is formed with a series of spaced longitudinal ridges 34 which mate with corresponding depressions along one wall of the groove to latch together the halves of an assembled shell 26. Each shell 26 has a generally cylindrical central section 35 having the internally projecting ribs 31, and a generally oval fill spout 36. The fill spout 36 includes an end wall 37 having an orifice 38 through which the material 30 may be poured into the assembled shell 26. The shell 26 also includes a cover 39 (FIG. 3) having spaced cylindrical projections 40 at each end adapted to be pressed into bores 41 in the end wall 37 of the fill spout 36 to afford attachment of the cover 39 to close the orifice 38. The shells 26 each have a set of external axially spaced radially projecting annular rings 43, each being generally square in cross section, which set of rings 43 forms a portion of an attaching means for attaching the parts of the housing 22 to the anchor member 20 as will later be explained. The openings through the assembled shell 26 for a cable or cables are formed in opposed outwardly extending truncated generally conical end walls 44, each having coaxial axially spaced grooves 46. The grooves 46 are guides to permit a craftsman to sever an opening of a desired diameter through each end wall 44 of the shell 26. As the openings thus severed may not precisely conform to the periphery of a cable or the peripheries of a plurality of cables passing through the shell 26, a mastic material such as "B-sealing tape" is preferably used about the cable or cables at the openings through the shell 26 to insure a liquid tight seal for the hardenable material 30 to be poured into the shell 26.

A suitable material 30 for use within the shells 26 must be capable of achieving a liquid state so that it may be poured into the shell 26 through the fill spout 36, and it must be capable of hardening within the shell 26 at a temperature range of from about 0° to +120° Fahrenheit to provide a solid material. The hardened material 30 must adhere to the jacket of a cable, which jacket may be scuffed by a craftsman to insure such adhesion, and should also closely conform around the ribs 31 on the interior surface of the shell 26 to provide a rigid anchor member 20 for engagement by the housing 22. Additionally, the hardened material should have sufficient adhesion to the jacket of a cable and sufficient internal strength to resist separation when subjected to the tension forces or external pressures encountered at the cable splice 11. Because the splice enclosure 10 may be subjected to widely varying temperatures over an extended period of time, it is generally desirable that the material retain the aforementioned physical characteristics when subjected to temperatures in the range of −40° to 140° Fahrenheit.

One such liquid self-hardening compound which has given particularly desirable results in terms of high initial fluidity, rapid cure, firm adherent bond to the surface of cables and high mechanical strength, consists of a mixture of liquid epoxy resin with a minor proportion of a liquid mixture of reagents reactive therewith and comprising liquid polythiopolymercaptan polymer and liquid polyamine. The epoxy resin is a reaction product of a bisphenol and epichlorohydrin, having free epoxy groups in the molecule. "Epon" resin No. 562 is a typical commercial example; and "Thiokol" polymer LP-2 is a commercial example of a suitable liquid polythiopolymercaptan polymer. Polyamines such as 2,4,6-tri(dimethylaminomethyl) phenol are effective activators for these compositions. The several components may be separately measured and all combined at the same time. More desirably, the amine and the polysulfide polymer are separately mixed together, and this mixture is combined with the epoxy resin just prior to pouring the composite into the shells 26. Mixing is conveniently accomplished in a flexible plastic bag, from which the mixture is poured directly into the open fill spouts 36 of the shells 26.

Polyurethane casting compounds such as Scotch Cast Brand Polyurethane Compounds No. 4401, No. 17, and No. 2100 are also suitable for use as the hardenable material 30.

The separable two part housing 22 which is adapted for engagement over the anchor members 20 to define the enclosed splice cavity 24 therebetween comprises two tough stiff molded arcuate walls preferably of polypropylene or a polyallomer which is translucent so that fill material 25 within the cavity 24 may be visually detected. The walls include a semi-cylindrical top wall 50 and a semi-cylindrical bottom wall 54 each having externally projecting reinforcing ribs 51 axially spaced along its length. The top wall 50 has two axially aligned edges 56 each having a longitudinal groove and being adapted to make with a longitudinal tongue 59 formed along a corresponding axially aligned edge 57 of the bottom wall 54 as is illustrated in FIGS. 4 and 5, so that the top and bottom walls 50 and 54 may be assembled to provide the cylindrical two part housing 22. The top wall 50 has a generally axially centered cylindrical fill spout 52 which may be used for inserting different types of materials into the splice cavity 24, and has a cap 53 adapted for internal threaded engagement with projections formed around the wall of the fill spout 52.

The top and bottom walls 50 and 54 are attached to the anchor members 20 by means which include a set of axially spaced annular rings 58 adjacent each end of the housing 22 with one half of each ring 58 being on the top wall 50 and the other half being on the bottom wall 54. Each ring 58 has a generally square cross section and projects inwardly from the inner surfaces of the top and bottom walls 50 and 54, which inner surfaces are semi-circular and conform to the outer surface of the outwardly projecting sets of rings 43 on the shells 26. Each set of rings 58 is spaced and sized to nest in the interstices between the set of rings 43 on the surface of a shell 26, and a conventional adjustable hose clamp 60 may be secured about each end of the two part housing 22 between a pair of outwardly projecting locating ribs 62 to securely engage the mating sets of annular rings 43 and 58.

Additionally, the attaching means includes a plurality of latch assemblies 63 for releasably attaching the top wall 50 to the bottom wall 54 when the edges of the walls 50 and 54 are mated. The latch assemblies 63 (best seen in FIGS. 1, 2 and 4) are spaced axially along both of the mating pairs of edges 56 and 57. Each latch assembly 63 includes one of a plurality of outwardly extending projections 64 spaced along each of the axially parallel edges 57 of the bottom wall 54, and one of a like number of stiff resilient, flexible, generally U-shaped members 66 spaced along and attached at their ends (as by being integrally molded) adjacent the axially aligned edges 56 of the top wall 50. When the edges 56 and 57 of the top and bottom walls 50 and 54 are moved into mating engagement, the distal end of each U-shaped member 66 moves along the external surface of the tongue 59 along an edge 57 of the bottom wall 54, and is subsequently resiliently deflected outwardly along an adjacent surface 67 of its mating projection 64. Upon full engagement of the edges 56 and 57 the U-shaped member 66 may releasably hook, or can be pressed, over the end of the projection 64 in the position shown in FIG. 4 to retain the edges 56 and 57 in engagement. The latch assembly 63 may subsequently be released by prying the end of the resilient U-shaped member 66 over the projection 64 by the use of finger pressure, or by twisting the flat blade of a screwdriver between the end of the U-shaped member 66 and the bottom wall 54.

The splice enclosure 10 according to the present invention also includes means to afford shortening of the splice cavity 24 as may be deemed desirable by the craftsman to enclose a particular splice 11. As illustrated in FIGS. 1 and 2, the two part housing 22 has a plurality of sets of inwardly projecting rings 68 identical to the sets of rings 58 formed adjacent its ends, and positioned at predetermined axially spaced intervals along its inner surface. Each of the sets of rings 68 and the portions of the top and bottom walls 50 and 54 supporting the halves of the rings 68 are adapted for engagement with the set of rings 43 on the anchor member 20. Also the exterior surface of the housing 22 opposite the set of rings 68 has a pair of guide rings 69 to facilitate proper positioning of the hose clamp 60. The craftsman may sever the housing adjacent the guide ring 69 opposite the fill spout 52 for the selected set of rings 66, and the selected set of rings may be engaged with the set of rings 43 on the anchor member 20 to provide a shortened splice cavity 24.

The splice enclosure 10 also includes means to facilitate separation of the top and bottom walls 50 and 54 upon re-entry of the splice enclosure 10. As is best seen in FIGS. 1 and 5, the assembled enclosure 10 has a plurality of slots 74 between the top and bottom walls 50 and 54 and spaced along both sets of mating edges 56 and 57. When a craftsman wishes to re-enter the splice cavity 24, and after he has removed the clamps 60 and released the latch assemblies 63, he may insert and rotate a flat instrument (such as a coin or screwdriver) in a slot 74 to aid in separating the top and bottom walls 50 and 54.

Each slot 74 is formed by a lug 73 along the tongue 59 on the bottom wall, and a mating opening in the outer lip forming the groove to receive the tongue 59 along the edge 56 of the top wall 50. One wall of the opening is co-planar with the bottom of the groove for the tongue 59, and the adjacent surface of the lug 73 is spaced therefrom to define the slot 74.

During mating of the edges 56 and 57 the lugs 73 engage their mating openings to provide proper axial alignment of the top and bottom walls 50 and 54 and proper mating alignment of the members of the latch assemblies 63. Subsequent to assembly of the housing 22, engagement of the lugs 73 with their mating openings restrains axial misalignment of the mating edges 56 and 57, thereby restricting twisting of the enclosure 10 as might occur via torsional forces in the spliced cables 12, 13, and 14.

Suitable materials for use in forming a layer of material 25 about the splice 11 within the splice cavity 24 include certain fine powders that may be compacted into a friable layer around a splice, liquids which may be poured into the splice cavity and then solidify to a friable layer around a splice, and viscous grease which may be coated in a layer around a splice. The layer of material 25 should have good dielectric properties, should not absorb or absorb water, should be essentially water insoluble, and should maintain high insulation resistance or immersion in water or when subjected to a high humidity environment. The material in the layer should closely surround, or wet and adhere to materials typically used in the connectors 16 such as polycarbonate and to materials typically used as insulation for the conductors such as polyethylene or polypropylene, and should not produce a chemical deterioration thereof. The material should be easily applicable by workmen in the field at normal application temperatures, and should maintain the aforementioned moisture restricting properties over a service range of from about −40° to +60° Centrigrade (−40° to +140° Fahrenheit). Also, an applied layer of material 25 should be easily removable from the splice by a workman in the field by breaking it or wiping it away.

A suitable grease should be soft and pliable at normal application temperatures and preferably should have a viscosity which will produce a penetrometer reading of from 200 to 280. The grease should maintain a generally uniform viscosity, and should not evaporate, bleed or lose adhesion over the service range indicated. A quantity of the grease may be worked into and around the completed splice, the top and bottom walls assembled, and the remaining empty portions of the splice cavity 24 filled through the fill spout 52 via a caulking gun. Upon re-entry of the splice enclosure 10, the grease may be wiped from the splice with a rag.

One example of a suitable grease is a thickened petroleum oil material sold by Minnesota Mining and Manufacturing Company under the trade designation of "Scotch Brand Re-enterable Encapsulant 4422". Another grease which should produce adequate results has been disclosed by Bell Telephone Laboratories, Inc. for filling the voids in jacketed communication cables and comprises a blend of 15 parts of low density polyethylene with 85 parts of petroleum jelly together with an appropriate antioxidant.

A suitable powder for use in forming the layer of material 25 should not absorb water. The powder should be finely divided (preferably in particles having an average maximum dimension of less than 10 micrometers) and afford manual compaction into a water impervious layer around a splice. The formed layer, when protected by the assembled splice enclosure 10, should retain its shape despite normal handling or burying of the splice, but should be sufficiently friable that it can be crumbled and removed by use of a bladed tool or by flexing the splice. In a preferred method of application the powder is poured into a flexible plastic sheet attached around a splice. The powder is then distributed and compacted into a layer around the splice by manually squeezing the exterior of the plastic sheet. The top and bottom walls 50 and 54 are then assembled to physically protect the compacted layer of material.

One example of a suitable powder is the calcium carbonate composition having a moisture resistant treatment which is sold under the trade designation "Protex E" by Pluess-Staufer (North American) Inc., 82 Beaver Street, New York, N.Y. Another example is the hydrocarbon powder sold under the trade designation Gilso-Therm 70 by the American Gilsonight Corporation.

Suitable materials which can be poured into the splice cavity 24 as a liquid and will then solidify in a layer around the splice must, when solid, be friable over the service range indicated so that they may be removed by a workman for re-entry. Liquids which solidify as a rigid layer and those which solidify as a jelly-like layer are both usable.

Examples of liquids which solidify as a rigid layer include two part, closed cell, low density urethane foams in the density range of 2 pounds per cubic feet to 20 pounds per cubic feet, with 2 to 4 pounds per cubic feet being preferred for ease of removal. In a preferred method of application a splice is wrapped in a layer of flexible plastic, the top and bottom walls 50 and 54 are assembled, and the area around the wrapped splice within the enclosure is filled with the foam forming liquid through the fill spout 52. The foam forming liquid may conveniently be applied from an aerosol can such as that provided in the "Insta-Foam Froth Pak" sold by Insta-Foam Products Inc., Addison, Ill. If the splice is re-entered, the top and bottom walls 50 and 54 are removed, which removal is facilitated as the foam will not adhere to the polyolefin material from which the top and bottom walls 50 and 54 are preferably formed. The foam is then broken away with the fingers or a bladed tool such as a screwdriver so that the splice can be unwrapped.

Liquids which form a jelly-like polyurethane containing 10 to 50 percent solids may be prepared by mixing two liquids including (1) a polyoxypropylene, polyoxyethylene, polyester, or polybutadiene polyols of functionality of two or greater and (2) an aromatic isocyanate of functionality of two or greater in an inert, compatible plasticizer.

The following is a specific example of two liquids which, when mixed, form a jelly-like polyurethane containing 20 percent solids. Throughout the example the parts indicated are by weight. 36.4 parts of a polybutadiene polyol of a functionality greater than two, commercially designated "Poly BD-15M" and available from Arco Chemical Company are mixed with 63.6 parts of ditridecyl phthalate and 0.1 to 0.3 parts of dibutyl tindilaurate to form a first liquid. 3.6 parts of an aromatic isocyanate commercially designated Isonate 143L and available from Upjohn Corporation are mixed with 96.4 parts of ditridecyl phthalate to form a second liquid. Prior to application of the liquids, the top and bottom walls 50 and 54 are assembled. The two liquids are thoroughly mixed together and then poured through the fill spout 52. The mixed liquids are sufficiently thin that they will run into and around the splice to completely fill the voids, and will then solidify into a jelly-like layer around the splice. Upon re-entry the workman can break the jelly-like layer and pick it away from the wires and connectors to be changed. After the change is completed the cavity may be refilled with more of the same liquid mixture which, upon solidification, will bond to the remaining portion of the original jelly-like layer.

The following is an example of preferred dimensions for a splice enclosure 10 according to the present invention adapted to receive from 3 to 100 pairs of conductors, in a cable or cables entering at each of its ends. The inner diameter of the splice cavity 24 is 3 inches. The maximum length of the splice cavity 24 is approximately 20 inches, however if it may be shortened to approximately 14 or 11 inches by severing the top and bottom walls 50 and 54 as previously indicated. The lengths of the cylindrical center sections 35 of the shells 26 are about 1¾ inches long to afford a secure bond between the resinous material 30 and the cable or cables passing through each shell 26, for which cables the openings through the end walls 44 may be as large as 2 inches in diameter. The shells 26 and housing 22 are molded of a translucent polypropylene and having minimum wall thicknesses of ⅛ inch (except for the grooves 45). Each of the rings 43, 58, and 68 is approximately ⅛ inch square in cross section. These dimensions provide the required high degree of axial strength for the assembled splice enclosure 10 to transfer cable tensions over the splice 11. Additionally, the top and bottom walls 50 and 54 are approximately 3/16 inch thick at the center of each reinforcing rib 51, which ribs 51 are molded at 1 inch intervals along the top and bottom walls 50 and 54 to provide the high degree of crush resistance required for the splice cavity 24.

The use of the re-enterable splice enclosure 10 will now be described. The cables to be spliced are positioned to afford forming the required splice 11, and the desired length of the splice cavity 24 is determined, which splice cavity 24 may then be shortened by severing the top and bottom walls 50 and 54 adjacent one of the sets of rings 68 as previously described. The proper location of the anchor members 20 adjacent the ends of the cables is then determined by temporarily locating one half of each shell 26 in the bottom wall 54 with the halves of the appropriate sets of rings 43, 58, 68 in engagement.

The appropriate lengths of the cable jackets are scuffed to improve adhesion of the material 30 used to form the anchor members 20, and a mastic material such as "B-Sealing Tape" is applied around the cables where the end walls 44 of the shells 26 will be located. The shell 26 halves are then removed from the bottom wall 54, and each end wall 44 is cut along one of the grooves 46 to provide an appropriate opening for the cable or cables. Each shell 26 is assembled at the appropriate position over the cable or cables to which it is to be attached, with the mastic material being pressed around the openings in the end walls 44 to provide a liquid tight seal. If desired, the junctions between the end walls 44 and cables may then be taped, and/or a temporary restraining clamp may be placed around each shell 26. The liquid material 30 is then mixed and poured into the shells 26 through the fill spouts 36, the fill spout covers 39 are attached, and the liquid is allowed to harden, which hardening will generally occur while the splice 11 is prepared as by attaching the connectors 16.

After the splice 11 is completed, one of the aforementioned materials is applied to form a water restricting layer of material 25 around the splice and assembly of the enclosure 10 is completed in the order appropriate for the material used. Application of the viscous grease is illustrative. The grease is worked around the exposed connectors and conductors in the splice 11, and the splice 11 is wrapped with an open mesh fiberglass scrim to space it from the walls 50 and 54. The temporary restraining clamps (if used) are then removed from the shells 26, and the top and bottom walls 50 and 54 are engaged with the anchor members 20 by engaging the set of rings 43 on each anchor member 20 with the appropriate sets of rings 58 or 68 on the housing 22. The hose clamps 60 are then attached around the housing 22, and the latch assemblies 63 are engaged. A caulking cartridge and gun is then used to insert a quantity of the grease through the fill spout 52 into the splice cavity 24 to fill the voids around the splice 11, which filling may be observed through the translucent housing 22. The cap 53 is attached. The splice enclosure is then fully attached, but access to the splice 11 may be easily had by removing the clamps 60, releasing the latch assemblies 63, removing the walls 50 and 54 and removing the layer of grease material from around the splice 11.

What I claim is:

1. A re-enterable splice enclosure restricting entrance of moisture into a splice between at least two lengths of jacketed communication cable, comprising a pair of anchor members, each of said anchor members being in secure engagement with one of said cables adjacent the terminal end thereof; a separable housing comprising two arcuate walls having axially aligned pairs of edges shaped for and in mating engagement, and having spaced ends engaged with said anchor members to define an enclosed splice cavity therebetween containing the splice between said cables; attaching means releasably attaching said arcuate walls to said anchor members and to each other including a plurality of projections along one edge of each pair of mating edges, and a plurality of flexible, resilient U-shaped members attached at their ends to the other edge of each pair of mating edges, each U-shaped member being releasably hooked over one of said projections to retain said mating edges in engagement; and a water restricting layer of water insoluble non-absorbant dielectric material within said splice cavity around the splice, which layer is easily removable to afford re-entry to the splice.

2. An enclosure according to claim 1, wherein said water restricting layer around the splice is manually compacted from a powder of particles having a major diameter or less than 10 micrometers.

3. An enclosure according to claim 1, wherein said material is a grease having a viscosity which will produce a penetrometer reading from 200 to 280 and having a generally uniform viscosity over the temperature range of −40° to +60° centigrade.

4. An enclosure according to claim 1, wherein said material is a closed cell foam having a density in the range of 2 to 20 pounds per cubic foot.

5. An enclosure according to claim 4, wherein said foam has a density in the range of 2 to 4 pounds per cubic foot.

6. An enclosure according to claim 1, wherein said layer of material is jelly-like.

7. An enclosure according to claim 1, wherein each of said anchor members has a set of exterior spaced radially projecting annular rings, said arcuate walls have adjacent each end a set of inwardly projecting spaced annular rings nesting in the interstices between the rings on one of said anchor members, and said attaching means includes a pair of clamps engaged about the ends of said two part housing to secure said housing to said anchor members via engagement of said sets of annular rings.

8. An enclosure according to claim 7, wherein said arcuate walls have a plurality of sets of inwardly projecting rings formed at predetermined axially spaced intervals along their inner surfaces, each set of rings being adapted for engagement with the set of rings on one of said anchor members, and said walls are adapted to be severed adjacent any of said sets of rings to provide a shortened splice cavity.

9. An enclosure according to claim 1, wherein said arcuate walls have spaced slots along said edges between the engaged arcuate walls to afford insertion of a flat tool to separate said arcuate walls.

10. A re-enterable splice enclosure restricting entrance of moisture into a splice between at least two lengths of jacketed communication cable, comprising:

anchor members in secure engagement with said cables adjacent the terminal ends thereof, each of said anchor members comprising:
 a shell engaged over the jacket of at least one cable and shaped to provide an annular cavity about said cable; and
 a hard resinous material within said annular cavity, said resinous material adhering to said cable and conforming to the inner surface of said shell to provide a rigid anchor member;
a separable two part housing having spaced ends engaged with said anchor members to define an enclosed splice cavity therebetween to contain the splice between said cables;

attaching means for releasably attaching said housing parts to said anchor members; and a layer of viscous water restricting dielectric material within said splice cavity around a splice, with respect to water said material being non-absorbing and insoluble, said material having the properties of wetting and adhering to polycarbonate, polyethylene and polypropylene, and having a generally uniform viscosity over a temperature range of from $-40°$ to $+120°$ F.

11. An enclosure according to claim 10, wherein each of said anchor members has a set of exterior spaced radially projecting annular rings, said two part housing has arcuate walls having adjacent each end a set of inwardly projecting spaced annular rings nesting in the interstices between the rings on one of said anchor members, and said attaching means includes a pair of clamps engaged engagement about the ends of said two part housing to secure said housing to said anchor members via engagement of said sets of annular rings.

12. A splice enclosure assembly according to claim 10, wherein said housing comprises a pair of arcuate walls having axially aligned edges shaped for and in mating engagement to form said housing, said attaching means includes a plurality of projections along the edges on one of said arcuate walls, and a plurality of flexible, resilient, U-shaped members attached at their ends to the other of said arcuate walls and each releasably hooked over one of said projections to retain said edges in engagement.

* * * * *